US012546141B2

(12) United States Patent
Fulk et al.

(10) Patent No.: US 12,546,141 B2
(45) Date of Patent: Feb. 10, 2026

(54) MAGNETIC DOOR LATCH ASSEMBLY

(71) Applicant: B/E Aerospace, Inc., Winston-Salem, NC (US)

(72) Inventors: Joseph M. Fulk, Lexington, NC (US); John C. Lovingood, Clemmons, NC (US); Lyle T. Davis, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/793,145

(22) Filed: Aug. 2, 2024

(65) Prior Publication Data

US 2026/0035960 A1 Feb. 5, 2026

(51) Int. Cl.
*E05B 47/00* (2006.01)

(52) U.S. Cl.
CPC .................................. *E05B 47/004* (2013.01)

(58) Field of Classification Search
CPC ........ E05C 17/56; E05C 19/16; E05C 19/166; Y10T 292/11; E05B 47/004; E05B 47/0038; E05B 47/0696
See application file for complete search history.

(56) References Cited

U.S. PATENT DOCUMENTS

| | | | | |
|---|---|---|---|---|
| 3,516,701 A * | 6/1970 | Graham | E05C 19/163 292/144 |
| 3,794,366 A * | 2/1974 | Graham | E05C 19/163 292/144 |
| 5,570,915 A | 11/1996 | Asadurian | |
| 7,234,739 B2 * | 6/2007 | Saitoh | E05C 19/163 292/251.5 |
| 2016/0168891 A1 | 6/2016 | McKinnon et al. | |
| 2022/0064992 A1 * | 3/2022 | Williams | E05B 65/0007 |
| 2023/0063848 A1 * | 3/2023 | Beardmore | E05B 65/0035 |

FOREIGN PATENT DOCUMENTS

CN 108678560 A * 10/2018 ......... E05B 17/0045

* cited by examiner

*Primary Examiner* — Christine M Mills
*Assistant Examiner* — Yahya Sidky
(74) *Attorney, Agent, or Firm* — Suiter Swantz IP

(57) ABSTRACT

A magnetic door latch assembly includes a magnetic receiver mountable in a door and a latch subassembly mountable in a door jamb. The latch subassembly includes at least one spring-loaded bolt magnetically drawn to the magnetic receiver such that, when the door is closed, the at least one spring-loaded bolt automatically extends to engage the magnetic receiver to maintain the door in a closed state. A spring-loaded depressible button is actuated to drive the at least one spring-loaded bolt apart from the magnetic receiver to allow the door to open. In embodiments, the magnetic door latch is configured for use with a wardrobe door in an aircraft interior application.

17 Claims, 9 Drawing Sheets

MAGNETIC DOOR LATCH ASSEMBLY

TECHNICAL FIELD AND BACKGROUND

The present disclosure relates generally to a door latch assembly, and more particularly, to a dual latch including spring-loaded bolts configured to magnetically engage a magnetic retainer to maintain a door closed, and automatically withdraw into the latch assembly when the door is open to provide a clean aesthetic for premium applications.

Swinging doors are commonly used to gain access into interior compartments. In aircraft, swinging doors may be associated with wardrobes, closets, cabinets, etc. Safety requirements for aircraft mandate that doors are secured when closed to prevent unintentional opening.

Traditional mechanisms for securing an aircraft door closed include latches and locks that operate in the same or separate mechanisms. Traditional latches are coupled to handles that are lifted or rotated to move a striker out of engagement with a strike plate to open the door. In certain applications, such handles may be protruding, unsightly, difficult to use, and noisy to operate, particularly when closing the door. As such, these types of traditional door latches are not suitable for premium interior applications. In addition, traditional latches do not include a built-in redundancy required for aircraft applications.

Therefore, what is needed is a latch solution that overcomes the disadvantages of the prior art.

BRIEF SUMMARY

According to one aspect, the inventive concepts according to the present disclosure are directed to a magnetic door latch assembly. In embodiments, the assembly includes a receiver subassembly mountable in a door and including a receiver, a first receiver magnet mounted in the receiver, and a second receiver magnet mounted in the receiver. The assembly further includes a latch subassembly mountable in a door jamb and including a bolt block, a first spring-loaded bolt slidably mounted in the bolt block, a first bolt magnet mounted in the first spring-loaded bolt, a second spring-loaded bolt slidably mounted in the bolt block, a second bolt magnet mounted in the second spring-loaded bolt, a spring-loaded depressible button, and a button cam mounted to the spring-loaded depressible button and configured to interact with the first and second spring-loaded bolts. In use, in a closed state of the door, the first and second spring-loaded bolts are engaged with the receiver via magnetic attraction between the respective first and second receiver magnets and the first and second bolt magnets, and pressing the spring-loaded depressible button causes the button cam to move the first and second spring-loaded bolts out of engagement with the receiver to allow the door to open.

In some embodiments, the latch subassembly further includes a first pin mounted to the first spring-loaded bolt, and a second pin mounted to the second spring-loaded bolt. In use, the button cam is configured to interact with the first and second pins to move the first and second spring-loaded bolts out of engagement with the receiver to allow the door to open.

In some embodiments, the latch subassembly further includes a first spring mounted on the first spring-loaded bolt and positioned between the bolt block and the first pin configured to bias the first spring-loaded bolt into the latch subassembly, and a second spring mounted on the second spring-loaded bolt and positioned between the bolt block and the second pin configured to bias the second spring-loaded bolt into the latch subassembly.

In some embodiments, a first magnetic attraction force between the first receiver magnet and the first bolt magnet is greater than a first spring force of the first spring such that, when the door is in the closed state, the first magnetic attraction force overrides the first spring force, and a second magnetic attraction force between the second receiver magnet and the second bolt magnet is greater than a second spring force of the second spring such that, when the door is in the closed state, the second magnetic attraction force overrides the second spring force.

In some embodiments, the latch subassembly further includes a third spring disposed between the bolt block and the spring-loaded depressible button configured to bias the spring-loaded depressible button outward.

In some embodiments, the bolt block defines a travel limiter including hard stops having bumpers configured to constrain linear motion of the spring-loaded depressible button.

In some embodiments, the spring-loaded depressible button is mounted to a carriage configured to travel along a linear rail configured to guide linear motion of the spring-loaded depressible button.

In some embodiments, the latch subassembly further includes first bushings positioned at the interface between the bolt block and the first spring-loaded bolt for facilitating sliding action of the first spring-loaded bolt, and second bushings positioned at the interface between the bolt block and the second spring-loaded bolt for facilitating sliding action of the second spring-loaded bolt.

In some embodiments, linear motion of the spring-loaded depressible button is perpendicular to linear motion of the first and second spring-loaded bolts.

According to another aspect, the inventive concepts according to the present disclosure are directed to a door assembly including a door subassembly including a door, a receiver mounted in the door, and at least one receiver magnet mounted in the receiver. The door assembly further includes a latch subassembly mountable in a door jamb and including a bolt block, at least one spring-loaded bolt slidably mounted in the bolt block, at least one bolt magnet mounted in the at least one spring-loaded bolt, a spring-loaded depressible button, and a button cam mounted to the spring-loaded depressible button configured to interact with the at least one spring-loaded bolt. In use, in a closed state of the door, the at least one spring-loaded bolt is engaged with the receiver via magnetic attraction between the at least one receiver magnet and the at least one bolt magnet, and pressing the spring-loaded depressible button causes the button cam to move the at least one spring-loaded bolt out of engagement with the receiver to allow the door to open.

In some embodiments, the latch subassembly further includes a bolt cover, and when the door is open, the at least one spring-loaded bolt is positioned flush with the bolt cover or recessed relative to the bolt cover.

In some embodiments, the door is a wardrobe door and the wardrobe door is spring-loaded to open.

In some embodiments, the magnetic attraction force between the at least one receiver magnet and the at least one bolt magnet is greater than the spring force of the at least one spring-loaded bolt such that, when the door is in the closed state, the magnetic attraction force overrides the spring force.

According to a further aspect, the inventive concepts according to the present disclosure are directed to a magnetic door latch assembly including a magnetic receiver mountable in a door, and a latch assembly mountable in a door jamb and including two spring-loaded bolts that are magnetically drawn to the magnetic receiver. In use, when the door is closed, the two spring-loaded bolts automatically magnetically attract to the magnetic receiver such that the two spring-loaded bolts extend from the latch assembly to engage the magnetic receiver, and when the door is open, the two spring-loaded bolts automatically withdraw into the latch assembly.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
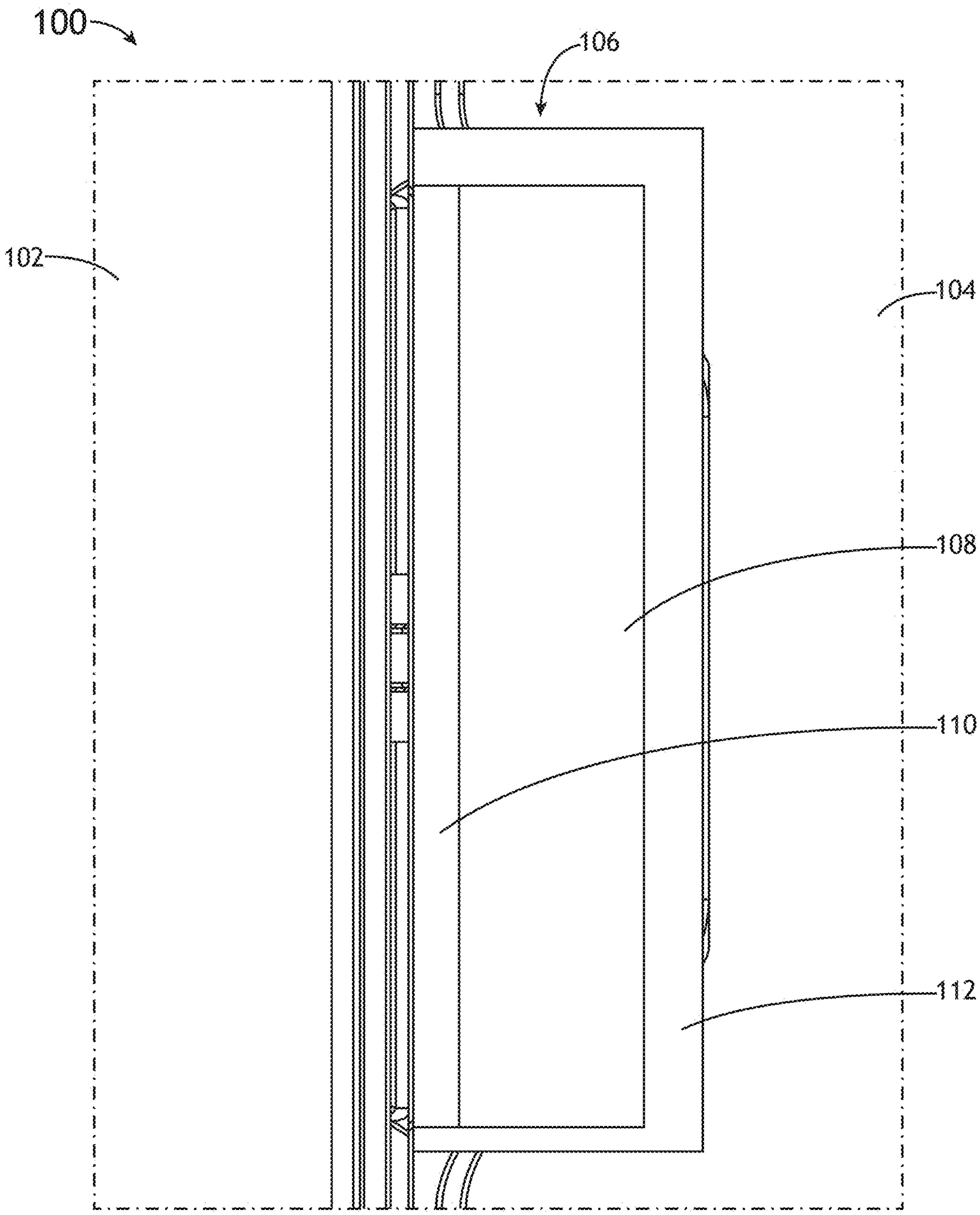
FIG. 1 is a fragmentary view of a door assembly including a magnetic door latch assembly, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a magnetic latch assembly and door assembly including the same. In embodiments, a latch subassembly includes dual spring-loaded bolts providing redundant latching performance in the event one of the bolts malfunctions or otherwise fails. In use, a push button is depressed to withdraw the bolts from their respective engagement in the door, while spring loading causes the bolts to remain concealed within the latch subassembly when the door is open to provide a clean aesthetic. Various bushings are provided to facilitate smooth and quiet motion of the moving components, while various cushioning elements are provided to avoid metal-on-metal contact for reducing noise when the latch assembly is operated. Magnets mounted in the bolts are magnetically drawn to magnets mounted in the door such that when the door is closed, the magnetic attraction causes the bolts to "jump the gap" and secure in the closed door. The magnetic latch assembly automatically resets when the door is open and automatically latches when the door is pushed closed, providing easy to use one-handed operation.

In a particular conceived example, the door is a swinging door that is spring-loaded to swing open when the bolts are disengaged. The door may be used to provide access to an interior space, for instance a wardrobe located in an aircraft interior. As described below, the magnetic latch assembly generally includes a magnetic retainer mountable to the door, and a latch subassembly mountable to the door jamb, although the reverse arrangement may be used. In embodiments, the action of a depressible release button is linear and perpendicular to the action of the bolts such that pressing the button into the plane of the door assembly causes the bolts to withdraw from the door into and into the door jamb where the bolts are concealed when the door is open. As described herein, the 'locked' state of the door corresponds to the bolts being received in the door, and the 'unlocked' state of the door corresponds to the bolts being withdrawn from the door.

FIG. 1 illustrates a door assembly 100 according to an exemplary embodiment of the present disclosure. The door assembly 100 generally includes a door 102, a door jamb 104, and a magnetic latch assembly 106 (or simply latch assembly) having portions mounted to or within each of the door 102 and the door jamb 104. The door 102 is shown closed and with the latch assembly 106 locked to prevent the door 102 from opening. The latch assembly 106 generally includes a spring-loaded depressible button 108 that faces out of the plane of the door to be presented to the user. In use, the depressible button 108 is pressed into the plane of the door/door jamb to initiate the action of the latch assembly 106 to unlock the door 102 to allow the door to open. In some embodiments, the door 102 is spring-loaded to open automatically when the door is unlocked. In some embodiments, the depressible button 108 is positioned between a bolt cover 110 and a trim bezel 112. The depressible button 108 and the trim bezel 112 may have any shape for aesthetic reasons. When the door 102 is closed and locked, the door 102, the door jamb 104, and the depressible button 108 may reside in substantially the same vertical plane to provide a clean aesthetic.

Figure 2:
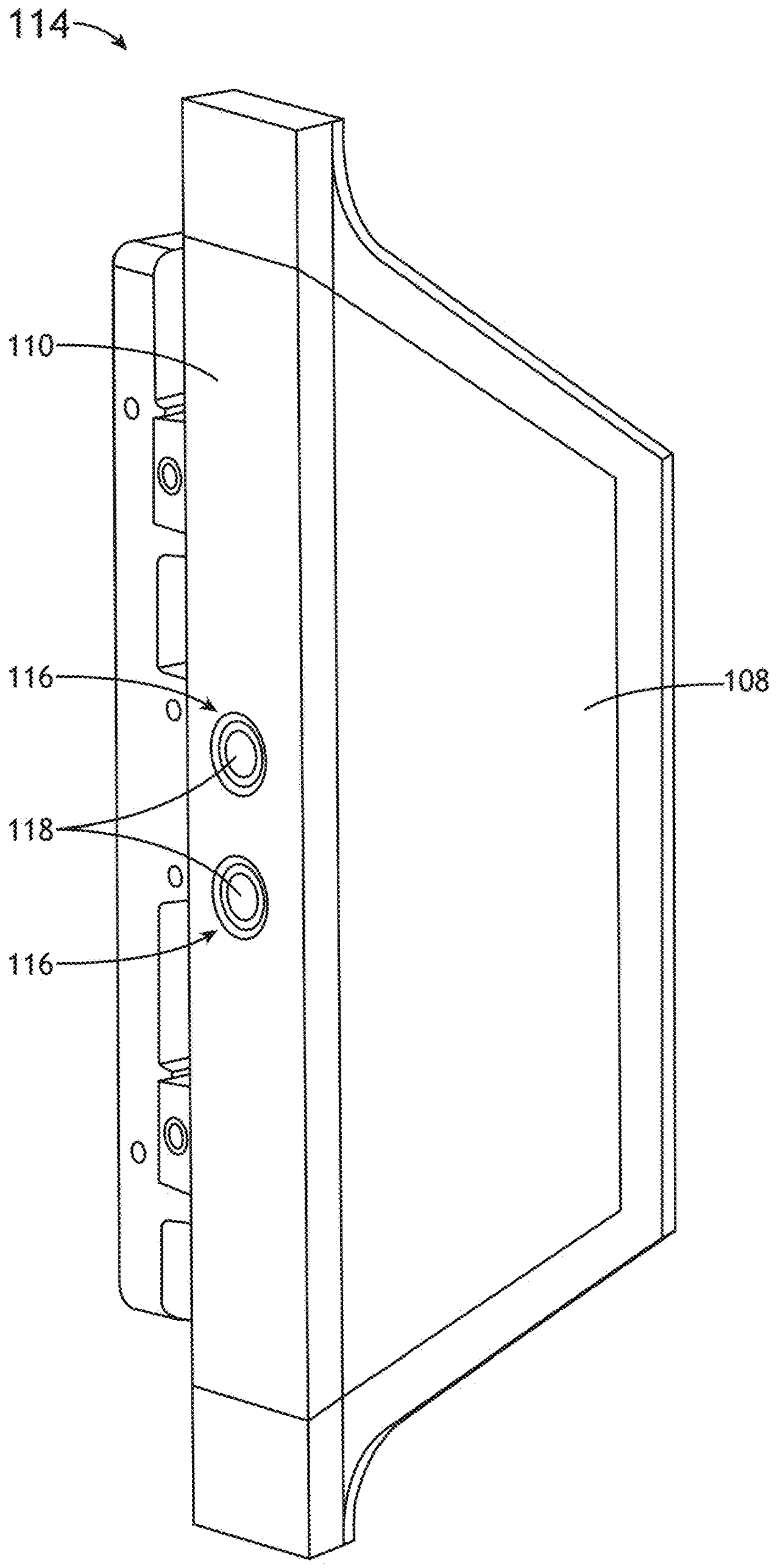
FIG. 2 is an isometric view of a latch subassembly of the door assembly, in accordance with example embodiments of this disclosure.

FIG. 2 illustrates the latch subassembly 114 of the overall latch assembly. As shown, the bolt cover 110 is mounted facing the unhinged edge of the door (not shown). The bolt cover 110 defines a pair of vertically spaced openings 116 that provide the interface around the translating spring-loaded bolts 118 (or simply bolts). While the latch subassembly 114 may include a single translating bolt 118, the latch subassembly 114 preferably includes first and second independently translating bolts 118 to provide a dual latch for redundancy in the event one bolt malfunctions or otherwise fails. The first and second bolts 118 may be vertically aligned as shown. In embodiments, the depressible button 108 may have a length of several inches to provide a relatively large pressing surface.

Figure 3:
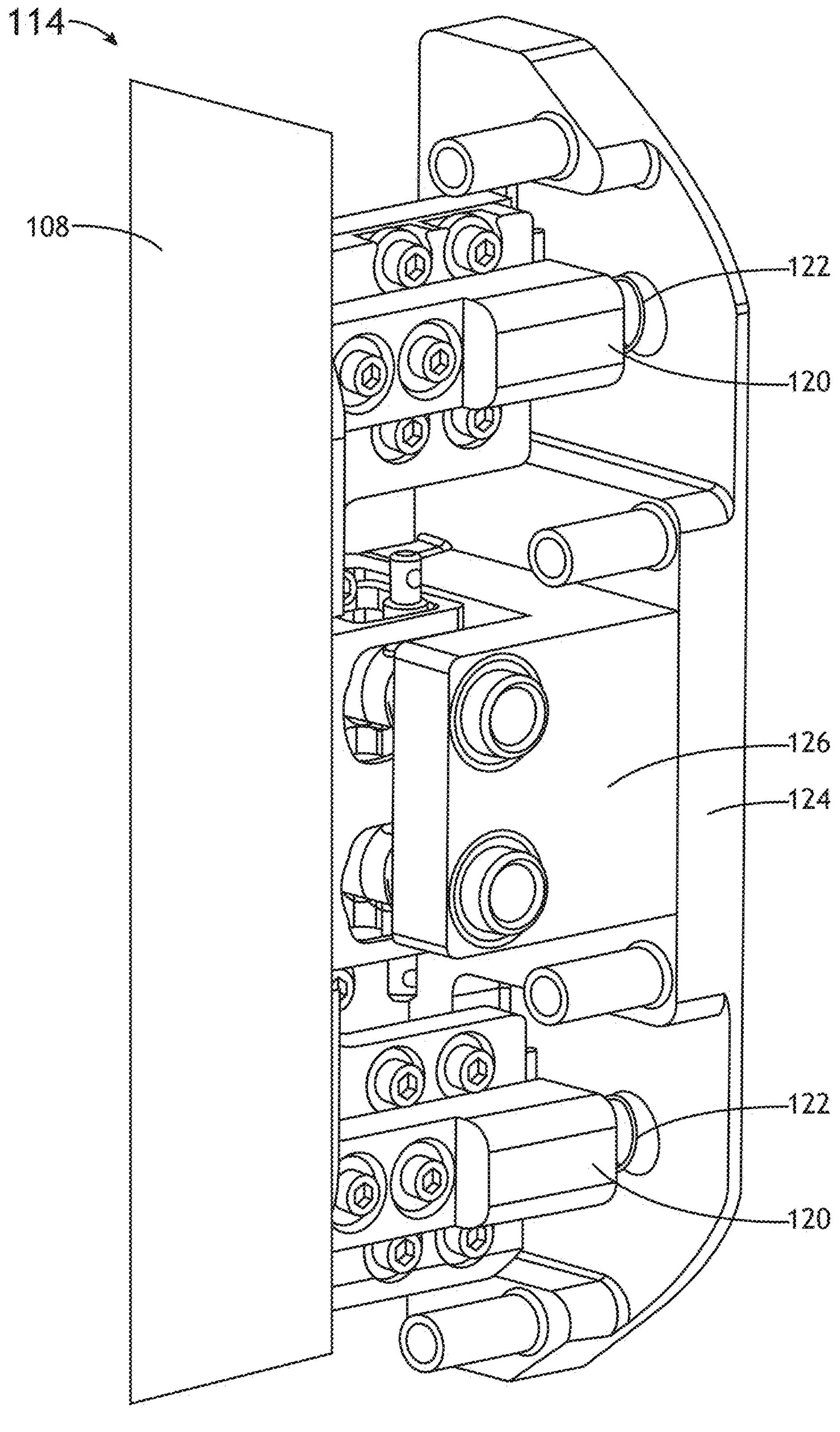
FIG. 3 is an isometric view of the latch subassembly showing internal details, in accordance with example embodiments of this disclosure.

FIG. 3 illustrates portions of the latch subassembly 114 revealed when the trim pieces are removed. In embodiments, the depressible button 108 is mounted to spring retainers 120 each configured to engage one end of a compressible coil spring 122 configured to constantly bias the depressible button 108 'outward.' Thus, the depressible button 108 is 'spring-loaded'. Depending on the length of the depressible button 108, spaced first and second spring retainers 120 (e.g., upper and lower) and coil springs 122 subassemblies may be provided to provide smooth and consistent pressing action regardless of where the depressible button 108 is pressed (e.g., top, middle or bottom of the button). The opposing ends of the coil springs 122 engage against a base plate 124 that may be attached to or integrally formed with a bolt block 126. As shown, the bolt block 126 is positioned between the upper and lower spring retainers 120. The configuration of the bolt block 126 is discussed in detail below.

Figure 4:
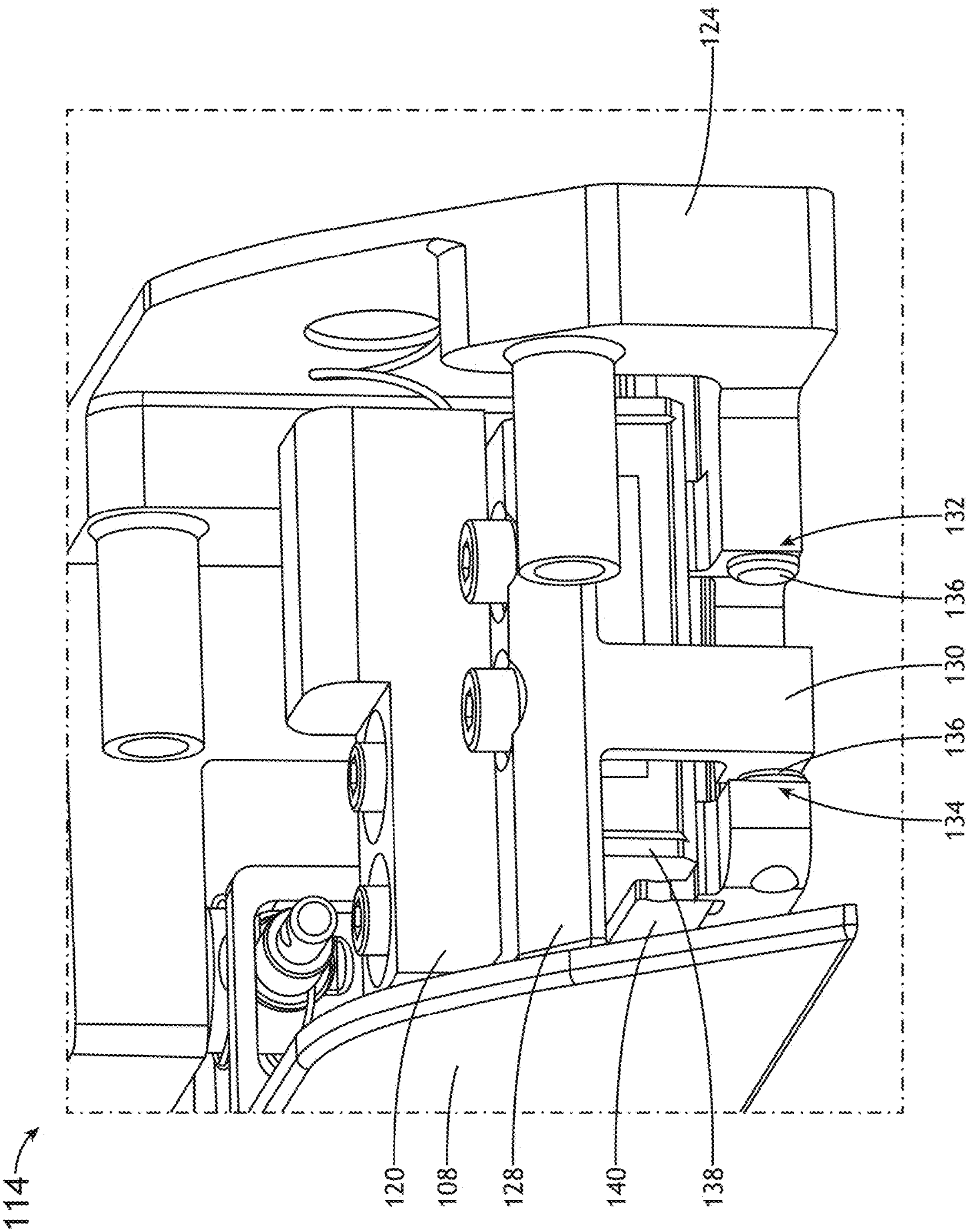
FIG. 4 is a fragmentary view of the latch subassembly showing details of the spring-loaded depressible button, in accordance with example embodiments of this disclosure.

FIG. 4 illustrates portions of the latch subassembly 114 for providing linear motion and limiting travel of the depressible button 108. First and second arms 128 mounted to or integrally formed with the depressible button may be attached to the spring retainers 120. A lateral extension 130 of the arm 128 is positioned between spaced hard stops 132, 134 formed by the base plate 124. In use, the lateral extension 130 travels back and forth between the spaced hard stops 132, 134 and engages the 'inner' hard stop 132 to limit travel of the depressible button 108 into the door jamb (to the right as shown in the drawing) and engages the 'outer' hard stop 134 to limit travel of the depressible button 108 out of the door jamb (to the left as shown in the drawing). In a non-limiting example, the linear travel of the depressible button 108 may be less than 1", more preferably less than ½", and most preferably about ¼". An elastomeric bumper or cushion 136 may be mounted to each hard stop 132, 134 to limit linear motion while also minimizing contact noise when operating the assembly.

In embodiments, the depressible button 108 is mounted to carriages 138 configured to travel along stationary linear rails 140 mounted to the base plate 124. The carriages 138 may be attached directly to the arms 128. In some embodiments, the linear rails 140 may be the recirculating ball type in which balls travel within grooves to provide smooth and quiet sliding action for the carriages 138.

Figure 5:
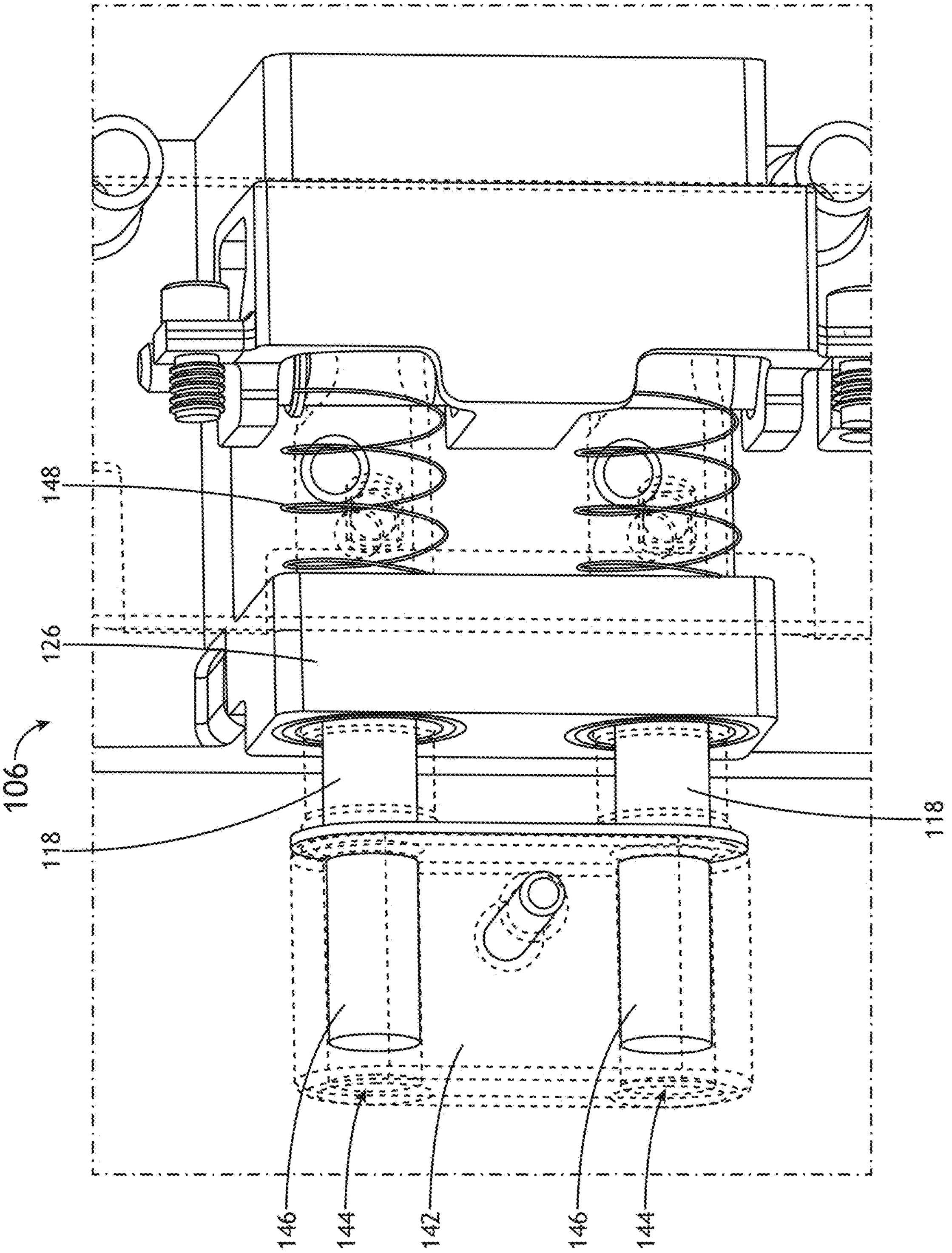
FIG. 5 is a fragmentary view of the door assembly showing a locked state of the door in which spring-loaded bolts engage a magnetic receiver, in accordance with example embodiments of this disclosure.

FIG. 5 illustrates the latch assembly 106 in the engaged or locked state. The latch assembly 106 further includes a retainer 142 mountable in the door. In embodiments, the retainer 142 includes first and second retainer holes 144, for instance through holes or blind holes. A retainer magnet 146 is disposed in each of the first and second retainer holes 144, for instance adhesively bonded therein. Retainer holes may be used where ends of the bolts 118 are physically received in the retainer 142. In embodiments in which the end of the bolts 118 meet the retainer 142, configurations other than holes may be used, for instance a solid magnetic retainer. In use, when the door is closed, the retainer magnets 146 magnetically attract bolt magnets to cause the bolts 118 to "jump the gap" between the door and the door jamb such that the ends of the bolts 118 are received in the door and/or in the retainer 142. In a non-limiting example, the bolts 118 may translate about 0.25 inches (i.e., about 6.0 mm) to jump a gap of about 0.10 inches (i.e., about 0.3 mm) to provide about 0.15 inches (i.e., about 0.4 mm) of engagement in the door.

The bolts 118 are spring-loaded such that, when the door is open and the bolt magnets are out of magnetic range of the retainer magnets 146, action of compressible coil springs 148 constantly biases the bolts 118 into the door jamb such that the bolts 118 are concealed when the door is open. In some embodiments, the bolts 118 may be color-coded (e.g., red or orange) to visibly indicate the locked state of the latch assembly. In some embodiments, the retainer and bolt magnets may be neodymium magnets. The bolts 118 are slidably disposed in bores formed in the bolt block 126, and the magnetic attraction force is greater than the spring force of the bolt springs 148 such that, when the door is closed, the retainer magnets 146 override the spring force of the coil springs 148 to translate the bolts 118 into engagement with the retainer 142.

Figure 6:
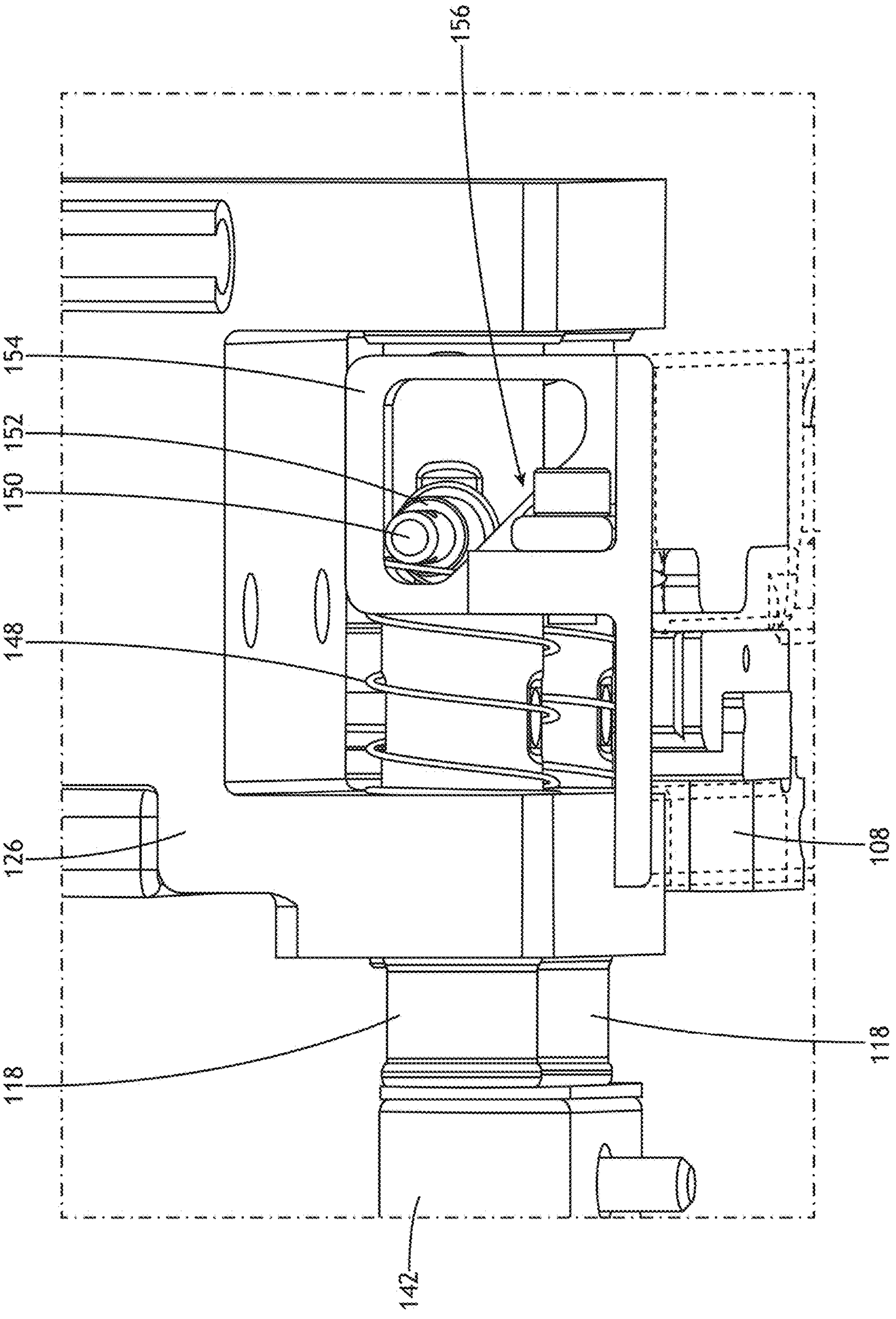
FIG. 6 is a fragmentary view of the door assembly showing the locked state of the door and corresponding position of the button cam, in accordance with example embodiments of this disclosure.

FIG. 6 illustrates the locked state of the door where the spring-loaded bolts 118 are engaged with the retainer 142.

Each spring-loaded bolt 118 carries a transverse pin 150. Each coil spring 148 is mounted on its respective bolt 118 such that one end of the coil spring engages an interior face of the bolt block 126 while the opposing end of the coil spring engages the transverse pin 150, or a bushing 152 mounted on the transvers pin 150. In use, the coil spring 148 pushes against the bolt block 126 and the pin 150 to bias the bolt 118 into the door jamb (to the right as shown in the drawing).

In embodiments, the depressible button 108 is attached to a button cam 154 forming a ramp 156 for interacting with the transverse pin 150. In use, the pressing action of the depressible button 108 moves the button cam 154 inward thereby causing linear motion of the bolt 118 (to the right as shown in the drawing) via the interaction of the ramp 156 and the transverse pin 150. In some embodiments, the configuration of the bolt block 126 includes the two spring-loaded bolts 118 configured to translate within their respective bores, a transverse pin 150 vertically mounted through each bolt 118, and spaced button cams 154 positioned to interact with the opposing ends of each of the transverse pins 150. In this configuration, each button cam 154 and bolt 118 subassembly operates independently for redundancy in case one subassembly malfunctions.

Figure 7:
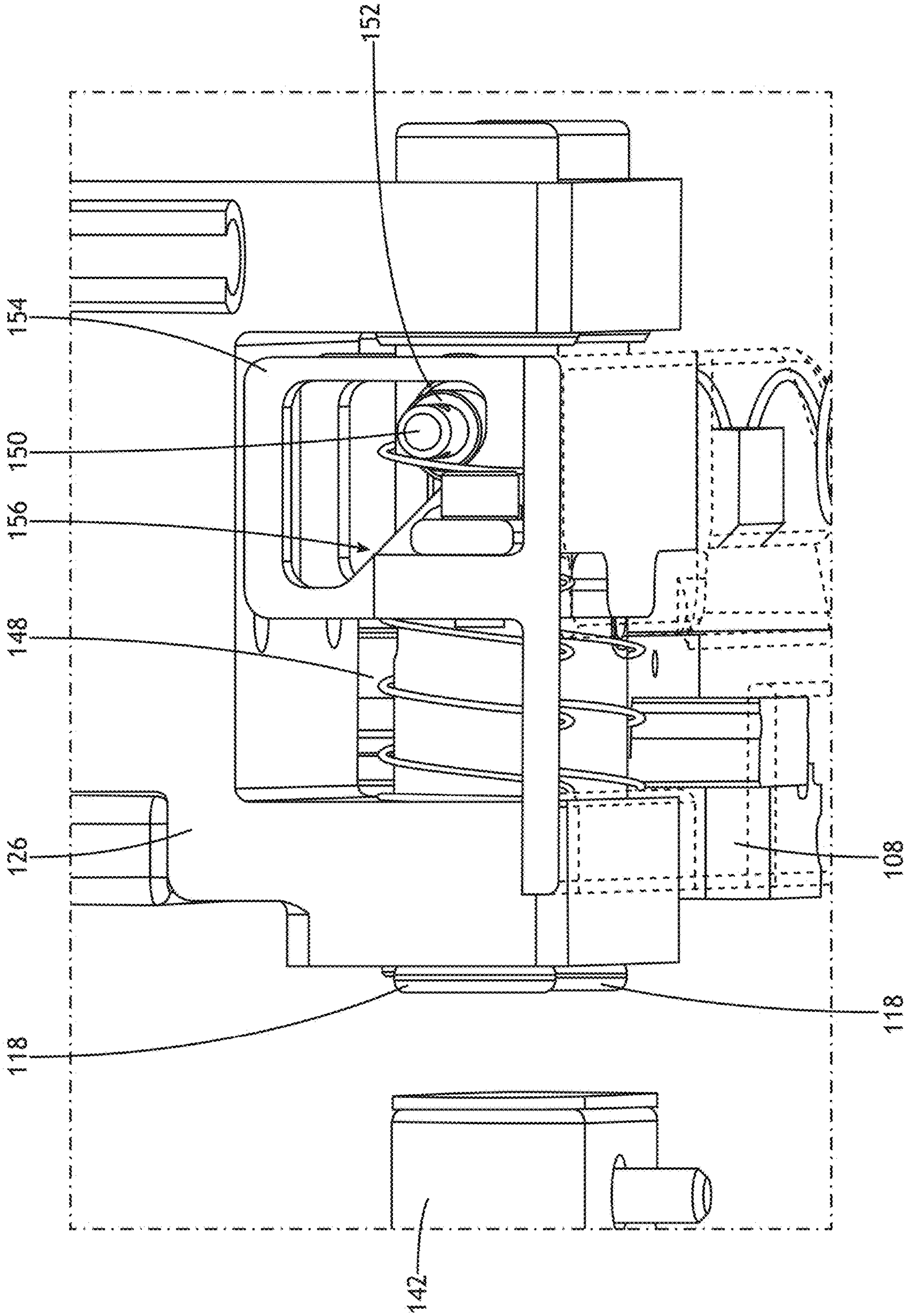
FIG. 7 is a fragmentary view of the door assembly showing the unlocked state of the door and corresponding position of the button cam, in accordance with example embodiments of this disclosure.

FIG. 7 illustrates the unlocked state of the door in which the depressible button 108 is pressed fully inward. Comparing FIGS. 6 and 7, it is evident that pressing the depressible button 108 inward causes the transverse pin 150 to move 'downward' along the ramp 156 (e.g., toward the right as shown in the drawing) thereby driving the bolts 118 to the right and out of engagement with the retainer 142, thereby freeing the door to be presented for opening.

Figure 8:
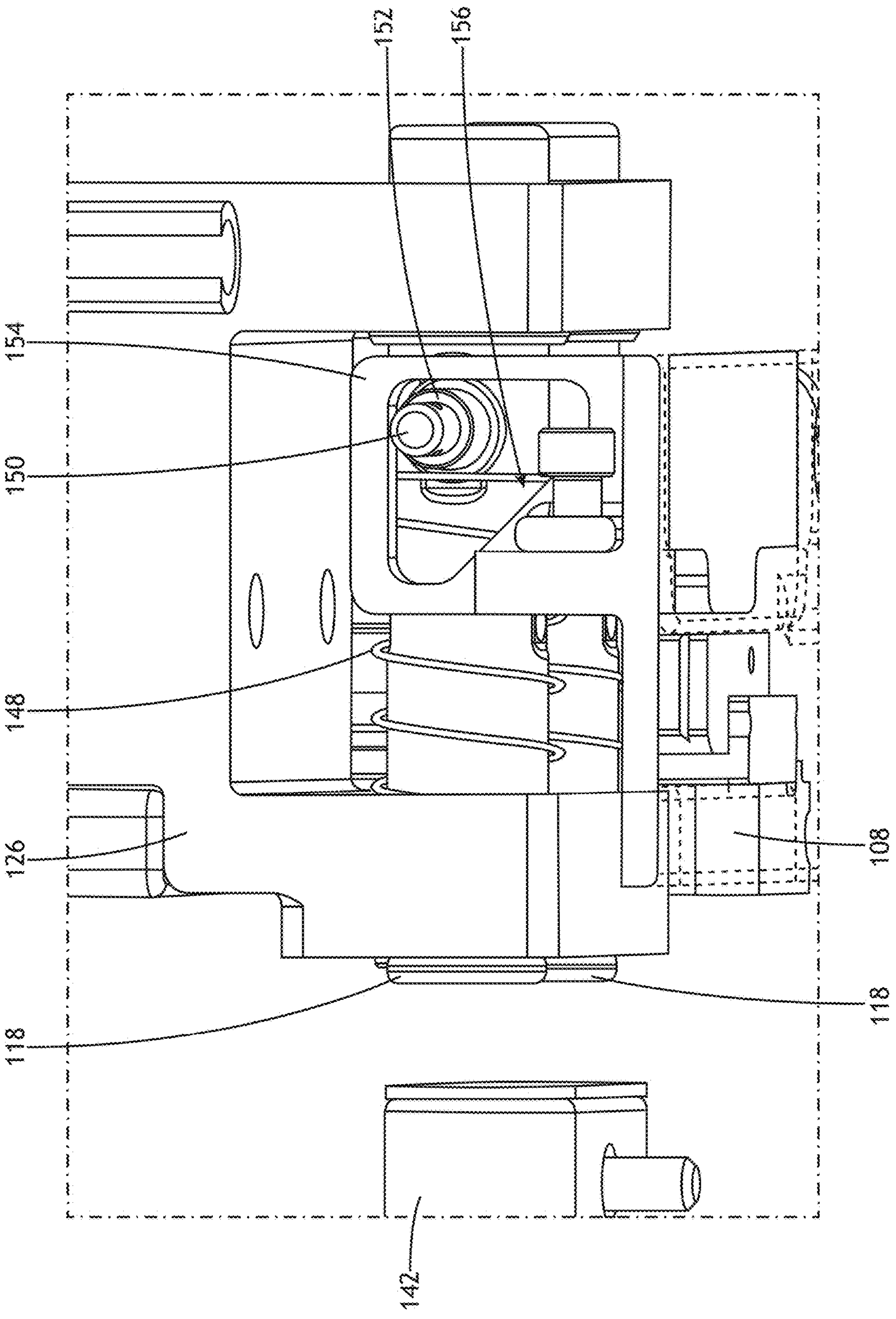
FIG. 8 is a fragmentary view of the door assembly showing the open state of the door and corresponding position of the button cam, in accordance with example embodiments of this disclosure.

FIG. 8 illustrates the unlocked state of the door where the depressible button 108 has been released thereby causing the spring-loaded depressible button 108 to return to its starting state. The button cam 154, attached to the depressible button 108, also moves outward thereby positioning the pin 150 at the 'top' and 'right' of the opening formed in the button cam 154. As shown, the substantially triangular shape defined by the button cam 154 provides the ramp 156 as well as clearance to allow the depressible button 108 to return to the starting position without interacting with the transverse pins 150. In this position, the bolts 118 are free to translate to their locked state (to the left as shown in the drawing) when the door is closed without interference from the button cams 154. While the door remains open, the spring force of the bolt springs 148 bias the bolts 118 toward their concealed state within the door jamb (to the right as shown in the drawing). Thus, the closing action of the door moves the bolt magnets into magnetic range of the retainer magnets thereby automatically causing the bolts 118 to jump the gap to engage in the door.

Figure 9:
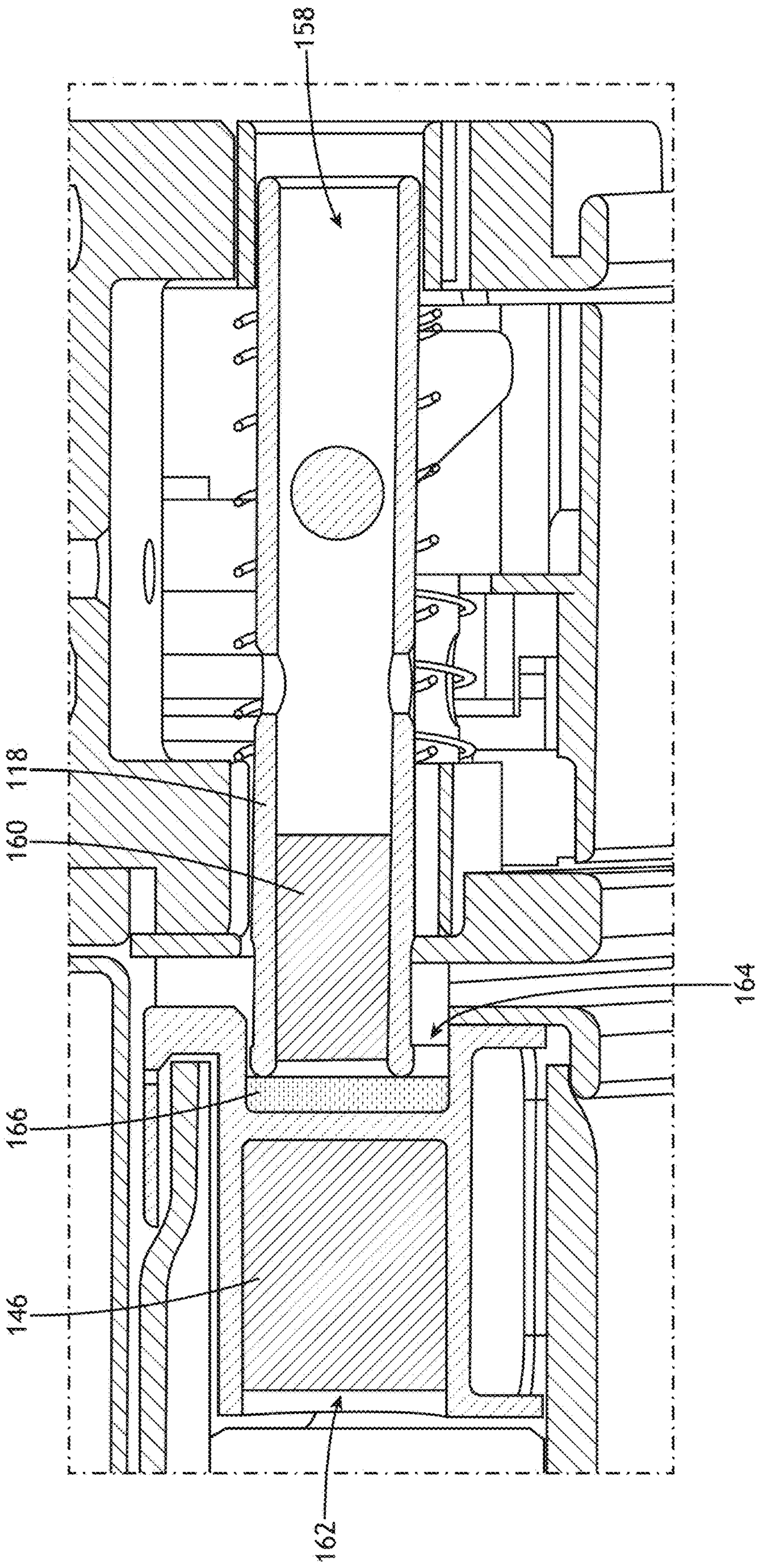
FIG. 9 is a fragmentary cross-sectional view of the door assembly showing the interaction of a spring-loaded bolt and magnetic receiver corresponding to a locked state of the door, in accordance with example embodiments of this disclosure.

FIG. 9 illustrates a non-limiting example of the magnet arrangement. As shown, each bolt 118 may define a deep counterbore 158 such that the bolt magnet 160 can be inserted from one end (the right end as shown in the drawing) and bonded in. In some embodiments, the bolts 118 and the receiver 142 may be stainless steel. The receiver 142 may include a first blind hole 162 for receiving the receiver magnet 146 and a second blind hole 164 for receiving the end of the bolt 118. In some embodiments, a cushion 166 may be positioned in the second blind hole 166 to minimize noise and promote magnet health as the magnets are drawn together. In embodiments, a small clearance between the receiver 142 and the bolt 118 prevents door motion when the door is locked, in addition to the spring loading of the door biasing the door in the outward direction against the receiver 142.

The door assembly described above is advantageous for use in various premium applications benefiting from a clean aesthetic, smooth linear motions, redundancy, and minimal operating noise, such as aircraft interior applications.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A magnetic door latch assembly, comprising:

a receiver subassembly mountable in a door, the receiver subassembly including:
- a receiver;
- a first receiver magnet mounted in the receiver; and
- a second receiver magnet mounted in the receiver; and a latch subassembly mountable in a door jamb, the latch subassembly including:
- a bolt block;
- a first spring-loaded bolt slidably mounted in the bolt block;
- a first pin mounted to the first spring-loaded bolt;
- a first bolt magnet mounted in the first spring-loaded bolt;
- a second spring-loaded bolt slidably mounted in the bolt block;
- a second pin mounted to the second spring-loaded bolt;
- a second bolt magnet mounted in the second spring-loaded bolt;
- a spring-loaded depressible button; and
- a button cam mounted to the spring-loaded depressible button, the button cam configured to interact with the first and second spring-loaded bolts;

wherein, in use:
- in a closed state of the door, the first and second spring-loaded bolts are engaged with the receiver via magnetic attraction between the respective first and second receiver magnets and the first and second bolt magnets; and
- pressing the spring-loaded depressible button causes the button cam to interact with the first and second pins to move the first and second spring-loaded bolts out of engagement with the receiver to allow the door to open.

2. The magnetic door latch assembly according to claim 1, further comprising:

a first spring mounted on the first spring-loaded bolt and positioned between the bolt block and the first pin, the first spring configured to bias the first spring-loaded bolt into the latch subassembly; and a second spring mounted on the second spring-loaded bolt and positioned between the bolt block and the second pin, the second spring configured to bias the second spring-loaded bolt into the latch subassembly.

3. The magnetic door latch assembly according to claim 2, wherein:

a first magnetic attraction force between the first receiver magnet and the first bolt magnet is greater than a first spring force of the first spring such that, when the door is in the closed state, the first magnetic attraction force overrides the first spring force; and a second magnetic attraction force between the second receiver magnet and the second bolt magnet is greater than a second spring force of the second spring such that, when the door is in the closed state, the second magnetic attraction force overrides the second spring force.

4. The magnetic door latch assembly according to claim 1, further comprising a third spring disposed between the bolt block and the spring-loaded depressible button, the third spring configured to bias the spring-loaded depressible button outward.

5. The magnetic door latch assembly according to claim 1, wherein the bolt block defines a travel limiter including hard stops having bumpers configured to constrain linear motion of the spring-loaded depressible button.

6. The magnetic door latch assembly according to claim 1, wherein the spring-loaded depressible button is mounted to a carriage configured to travel along a linear rail configured to guide linear motion of the spring-loaded depressible button.

7. The magnetic door latch assembly according to claim 1, further comprising:

first bushings positioned at the interface between the bolt block and the first spring-loaded bolt for facilitating sliding action of the first spring-loaded bolt; and second bushings positioned at the interface between the bolt block and the second spring-loaded bolt for facilitating sliding action of the second spring-loaded bolt.

8. The magnetic door latch assembly according to claim 1, wherein linear motion of the spring-loaded depressible button is perpendicular to linear motion of the first and second spring-loaded bolts.

9. A door assembly, comprising:

a door subassembly, including:

a door;

a receiver mounted in the door; and at least one receiver magnet mounted in the receiver; and a latch subassembly mountable in a door jamb, the latch subassembly including:

a bolt block;

at least one spring-loaded bolt slidably mounted in the bolt block;

at least one bolt magnet mounted in the at least one spring-loaded bolt;

a spring-loaded depressible button;

a button cam mounted to the spring-loaded depressible button, the button cam configured to interact with the at least one spring-loaded bolt; and at least one pin mounted to the at least one spring-loaded bolt;

wherein, in use:

in a closed state of the door, the at least one spring-loaded bolt is engaged with the receiver via magnetic attraction between the at least one receiver magnet and the at least one bolt magnet; and pressing the spring-loaded depressible button causes the button cam to interact with the at least one pin to move the at least one spring-loaded bolt out of engagement with the receiver to allow the door to open.

10. The door assembly according to claim 9, wherein:

the latch subassembly further comprises a bolt cover; and when the door is open, the at least one spring-loaded bolt is positioned flush with the bolt cover or recessed relative to the bolt cover.

11. The door assembly according to claim 9, wherein the door is a wardrobe door and the wardrobe door is spring-loaded to open.

12. The door assembly according to claim 9, further comprising at least one spring mounted on the at least one spring-loaded bolt and positioned between the bolt block and the at least one pin, the at least one spring configured to bias the at least one spring-loaded bolt in a direction of the door jamb.

13. The door assembly according to claim 12, wherein magnetic attraction force between the at least one receiver magnet and the at least one bolt magnet is greater than a spring force of the at least one spring such that, when the door is in the closed state, the magnetic attraction force overrides the spring force.

14. The door assembly according to claim 9, further comprising a button spring disposed between the bolt block and the spring-loaded depressible button, the button spring configured to bias the spring-loaded depressible button outward.

15. The door assembly according to claim 9, wherein the spring-loaded depressible button is mounted to a carriage configured to travel along a linear rail configured to guide linear motion of the spring-loaded depressible button.

16. A magnetic door latch assembly, comprising:

a magnetic receiver mountable in a door; and a latch assembly mountable in a door jamb, the latch assembly including two spring-loaded bolts that are magnetically drawn to the magnetic receiver, and the latch assembly including a button cam mounted to a spring-loaded depressible button configured to interact with two transverse pins mounted on the respective two spring-loaded bolts to, when the spring-loaded depressible button is pressed, move the two spring-loaded bolts out of engagement with the magnetic receiver to allow the door to open;

wherein, when the door is closed, the two spring-loaded bolts automatically magnetically attract to the magnetic receiver such that the two spring-loaded bolts extend from the latch assembly to engage the magnetic receiver; and wherein, when the door is open, the two spring-loaded bolts automatically withdraw into the latch assembly.

17. The magnetic door latch assembly according to claim 16, wherein linear motion of the spring-loaded depressible button is perpendicular to linear motion of the two spring-loaded bolts.

* * * * *